United States Patent
Itou (10) Patent No.: US 10,663,990 B2
(45) Date of Patent: May 26, 2020

(54) COOLING MECHANISM FOR MACHINE

(71) Applicant: FANUC CORPORATION, Minamitsuru-gun, Yamanashi (JP)

(72) Inventor: Masanori Itou, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 167 days.

(21) Appl. No.: 15/406,144

(22) Filed: Jan. 13, 2017

(65) Prior Publication Data
US 2017/0205839 A1    Jul. 20, 2017

(30) Foreign Application Priority Data
Jan. 14, 2016    (JP) ................. 2016-005568

(51) Int. Cl.
*G05D 23/19* (2006.01)
*G05B 13/02* (2006.01)
*G05B 19/408* (2006.01)

(52) U.S. Cl.
CPC ....... *G05D 23/1917* (2013.01); *G05B 13/026* (2013.01)

(58) Field of Classification Search
CPC ...... G05D 23/1917; F01P 7/00; G05B 13/026
USPC ........................................................ 700/300
See application file for complete search history.

(56) References Cited

U.S. PATENT DOCUMENTS

| | | | | |
|---|---|---|---|---|
| 2005/0273208 A1* | 12/2005 | Yazawa | ................... | G01K 7/425 700/299 |
| 2008/0186670 A1* | 8/2008 | Lyon | ....................... | G06F 1/206 361/679.46 |
| 2008/0229082 A1* | 9/2008 | Miyamoto | ......... | G05B 19/0421 712/226 |
| 2010/0274522 A1* | 10/2010 | Sri-Jayantha | ........... | G06F 1/206 702/130 |
| 2010/0280680 A1* | 11/2010 | Angell | .................... | G06F 1/206 700/300 |
| 2014/0052429 A1* | 2/2014 | Kelkar | .................. | G06F 3/0625 703/13 |
| 2014/0197772 A1* | 7/2014 | Morita | .................... | H02P 27/08 318/503 |
| 2017/0011882 A1* | 1/2017 | Yen | ......................... | H01J 37/24 |

FOREIGN PATENT DOCUMENTS

| JP | H0740184 A | 2/1995 |
|---|---|---|
| JP | 2003-245842 A | 9/2003 |

OTHER PUBLICATIONS

Notification of Reasons for Refusal for Japanese Application No. 2016-005568, dated Nov. 28, 2017, including English translation, 6 pages.

* cited by examiner

*Primary Examiner* — Jigneshkumar C Patel
(74) *Attorney, Agent, or Firm* — RatnerPrestia

(57) ABSTRACT

A cooling mechanism for a machine of the present invention comprises a cooler for cooling the inside of a control board of the machine including a machine controller for controlling a drive unit based on commands contained in an applications, includes a pre-fetcher for pre-fetching commands contained in the applications, a heat value predictor for predicting a heat value to be generated inside the control board based on a command pre-fetched by the pre-fetcher, and a cooling controller for controlling an operation of the cooler based on the heat value inside the control board thus predicted by the heat value predictor.

4 Claims, 7 Drawing Sheets

COOLING MECHANISM FOR MACHINE

BACKGROUND OF THE INVENTION

Field of the Invention

The present invention relates to a cooling mechanism for a machine, and particularly to a machine cooling mechanism which cools a control board in response to commands for controlling the machine.

Description of the Related Art

Electronic devices disposed inside a control board of a working machine generate heat to rise the temperature within the control board. Since every electronic device has its upper operative temperature limit for operating the device stably, the control board needs to be provided with a cooling mechanism to avoid the temperature inside the board from rising beyond the operative temperature limit.

Figure 7:
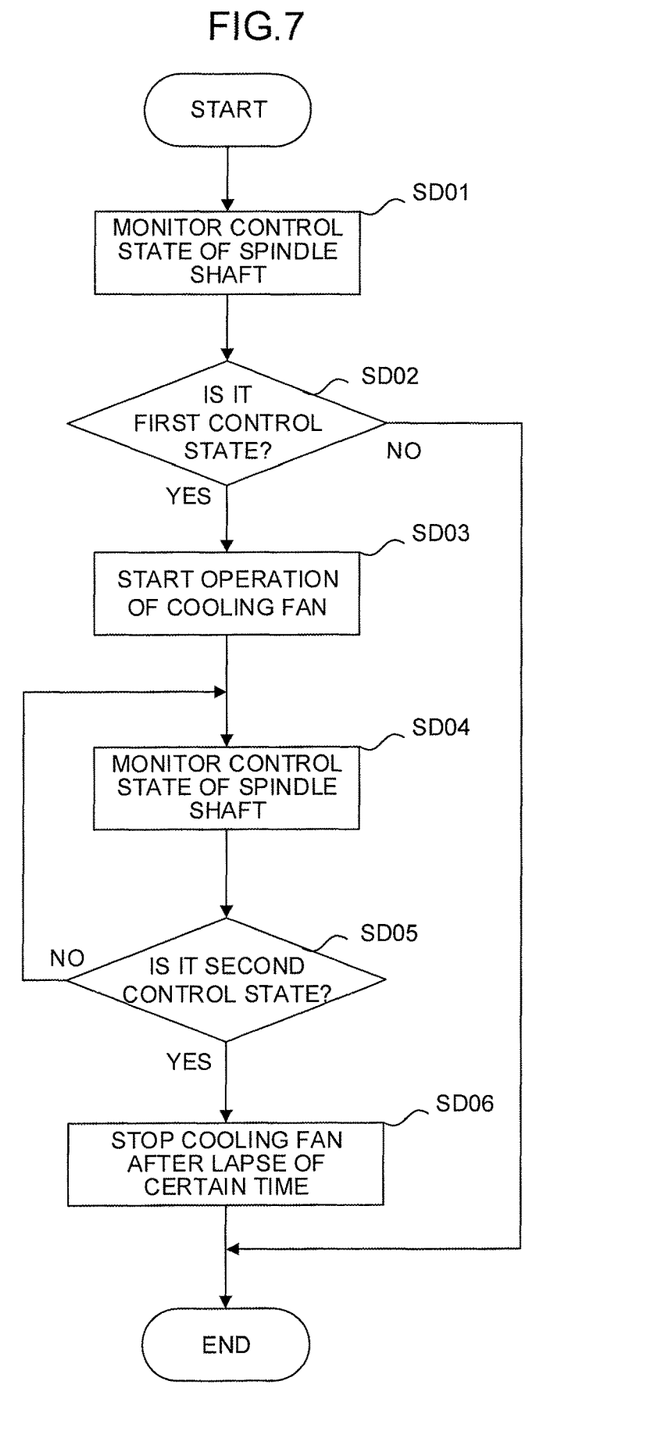
FIG. 7 is a flowchart showing an operation of cooling means according to a prior art.

According to prior solutions, means for cooling inside a control board is typically configured to measure the temperature inside the control board, and initiate enabling a cooler when the temperature exceeds a predetermined threshold. However, because of a temperature difference between an actual heat-generating element and a measuring spot, there is a possibility that the cooler does not operate when the cooling is actually required. JP 2003-245842 A discloses cooling means adapted, as shown in FIG. 7, to predict heat that could be generated inside a control board based on control states of a machine so as to initiate enabling a cooler.

However, the solution taught in JP 2003-245842 A determines the necessity of cooling on the basis of an actual operative state of the machine during a predetermined period, which causes a problem that the temperature inside the control board could have already increased when the cooling is conducted.

SUMMARY OF THE INVENTION

It is an object of the present invention to provide a cooling mechanism for a machine, which predicts in advance how temperature inside a control board would be so as to control the operation of a cooler.

In accordance with the present invention, the cooling mechanism pre-fetches a command contained in an application, and predicts, based on the pre-fetched command, a heat value that may be generated in a control board of a machine. The cooling mechanism then controls an operative state of the cooler based on the predicted heat value in the control board.

The prediction about heat values relies upon using commands pre-fetched from applications to calculate the number of motors to be operated, values of electric current flowing through amplifiers. For example, when shifting the axes X, Y and Z, loads such as the weights of components, such as work tables, equipped in the machine, and works to be machined are already known, so that the current values of the amplifiers can be figured out, thereby allowing heat values to be predicted. Furthermore, since a load to be exerted during machining varies significantly under machining conditions, it may be advantageous to calculate out the current values of amplifiers based on an actual load, or alternatively to directly measure such current values, to map the load with a machining application for feeding it back to the next and subsequent heat value predictions.

In accordance with the present invention, the cooling mechanism including at least one cooler cooling inside of a control board of the machine comprising a machine controller controlling a drive unit based on a command contained in an application comprises a pre-fetcher pre-fetching the command contained in the application, a heat value predictor predicting a heat value to be generated inside the control board based on the command pre-fetched by the pre-fetcher, and a cooling controller controlling an operation of the at least one cooler based on the heat value inside the control board predicted by the heat value predictor.

In accordance with the cooling mechanism of the present invention, the cooling controller controls the operation of the cooler in time with a controlled operation performed on the basis of the command by the machine controller.

In accordance with the present invention, the cooling mechanism further comprises a feedback data collector acquiring feedback data indicative of an actual operative state of the machine, wherein the heat value predictor uses the command pre-fetched by the pre-fetcher as well as the feedback data acquired by the feedback data collector to predict a heat value to be generated inside the control board.

In accordance with present invention, the cooling mechanism, in which the cooler is provided in plural, further comprises a cooling spot map storage storing data mapping a plurality of heat sources in the control board with the coolers, wherein the heat value predictor predicts a heat source which would generate heat inside the control board, based on the command pre-fetched by the pre-fetcher, and predicts a value of heat which would be generated by the heat source, and the cooling controller refers to the cooling spot map storage based on the heat source predicted by the heat value predictor to determine the coolers to be operated, and then controls the operation of the determined cooler based on the heat value to be generated inside the control board predicted by the heat value predictor.

According to the present invention, since the necessity of cooling is determined based on applications to be used in machine control, no temperature sensors are required therefor, and moreover the cooling can start before the temperature in the control board actually increases, thus the life of electronic components can be extended. Furthermore, pre-fetching machining applications of usually several commands, the control can be conducted without being affected by a load momentarily becoming heavier. In addition, the cooling can be carried out around heat-generating spots locally, thus more efficient cooling can be conducted.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Some embodiments of the present invention will now be described in detail with reference to the accompanying drawings.

First Embodiment

Figure 1:
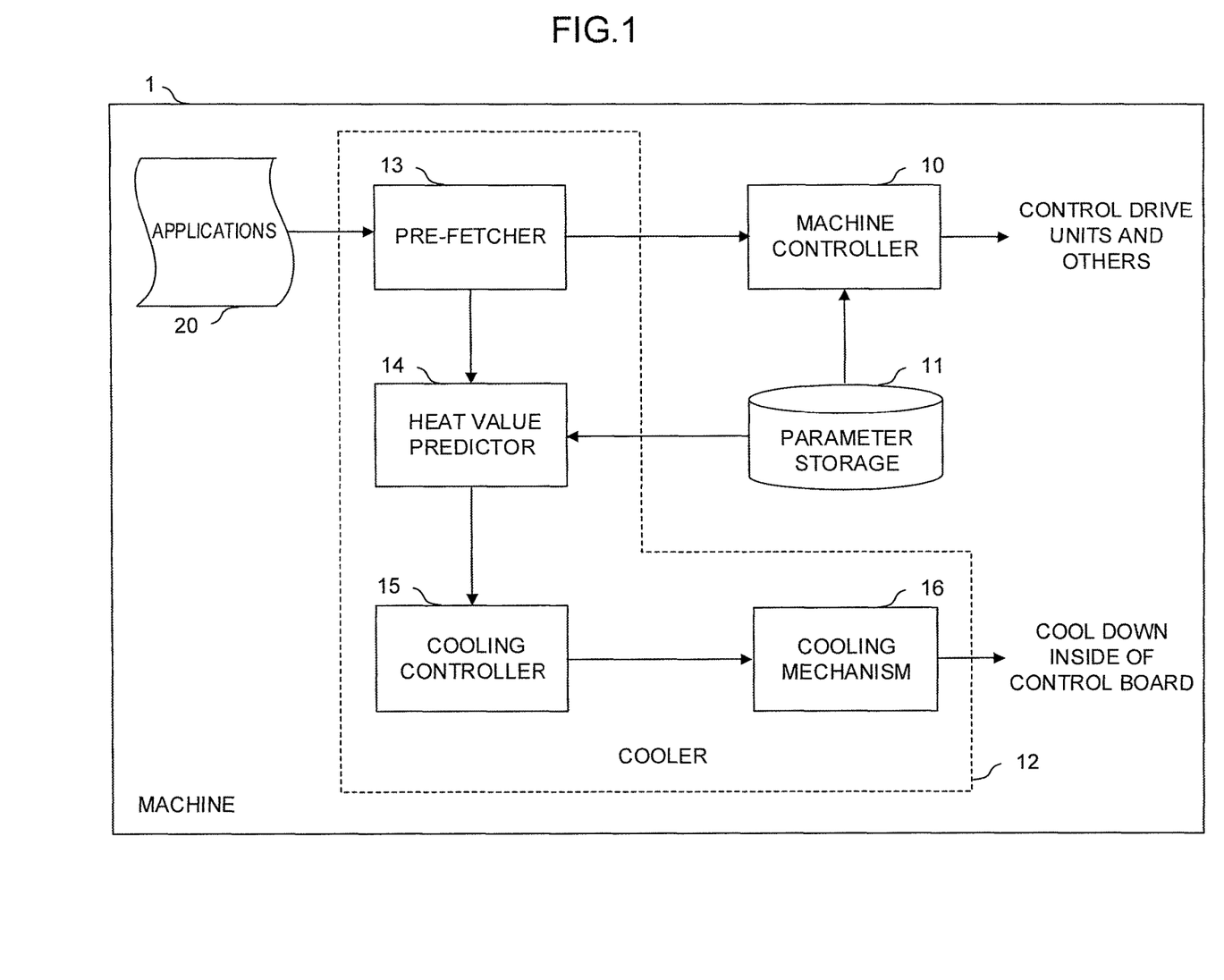
FIG. 1 is a schematic block diagram showing a cooling mechanism 12 for a machine according to a first embodiment of the present invention.

FIG. 1 is a schematic block diagram showing a cooling mechanism for a machine according to a first embodiment of the present invention. In the illustrative embodiment, a machine 1 includes a machine controller 10 which controls each drive unit of the machine 1 in response to commands readout from applications 20 stored in an application storage, not shown, as well as a variety of parameters associated with the operation of the machine 1, such as processing or machining conditions, work load, tool load and the like, which are stored in advance in a parameter storage 11 by the operator or the like. A cooling mechanism 12 is adapted to cool a control board, not shown, so as to prevent the excessive rising of the inside temperature due to heat generated in amplifiers or others when controlled by the applications 20.

The cooling mechanism 12 includes a pre-fetcher 13, a heat value predictor 14, a cooling controller 15 and a cooler 16.

The pre-fetcher 13 pre-fetches a command from the applications 20 stored in the application storage, not shown, to buffer it therein while outputting the command thus pre-fetched to the heat value predictor 14. The pre-fetcher 13 also outputs the buffered command to the machine controller 10 upon request of the machine controller 10. The pre-fetcher 13 may be configured to pre-fetch at least a command successive to a last command the machine controller 10 is currently executing. In this case, the pre-fetcher 13 pre-fetches one command from the applications 20 to buffer the fetched command therein while outputting that command to the heat value predictor 14. In addition, when the machine controller 10 has completed the control based on the last command currently implemented and thereafter requests the pre-fetcher 13 for the next command, the pre-fetcher 13 in turn outputs the command currently buffered therein to the machine controller 10, and then pre-fetches a command following the buffered one from the applications 20. The pre-fetcher 13 may be configured to pre-fetch and buffer several commands successive to the command currently being executed by the machine controller 10, and outputs the pre-fetched commands to the heat value predictor 14.

The heat value predictor 14 specifies, on the basis of the pre-fetched command received from the pre-fetcher 13, following operation of the units of the machine 1 under the control of the machine controller 10, and predicts a value of heat otherwise generated inside the control board of the machine 1 based on the specified operation. The heat value predictor 14 may employ various techniques to predict heat values. By way of example, the heat value prediction can be implemented according to the following steps.

Step 1 (Preparation): An experiment or similar is conducted in advance to create a data conversion table defining the relationship between the operations of the machine 1, e.g. axial movement, and operation parameters such as moving rates or weights of a work and motor outputs required for the movement, then thus obtained table is stored in a memory or the like, not shown. In the data conversion table, continuous values, such as the moving rates and the weights, may be derived with predetermined value increments, e.g. 100 mm/min for moving rate or 100 kg for weight of a work with respect to a representing value.

Step 2 (Preparation): Since the motor output is generally proportionate to an electric current, several patterns of driving experiments are conducted beforehand to form a conversion formula defining the relationship of the motor outputs with the current values of a drive amplifier, and store the formula in the memory, not shown. Formula 1 shown below is a model of the conversion formula. In Formula 1, K and a are coefficients determined based on the characteristics of the motor. Alternatively, a conversion data table, instead of the conversion formula, may be created by measuring many motor outputs with respect to the current values of the amplifier in order to convert the motor outputs into the current values of the amplifier by means of the conversion data table.

$$\text{Motor output} = K \times \text{current value of amplifier} + a \quad \text{(Formula 1)}$$

Step 3: When the machine is actually operated, values, e.g. a value of the moving rate and a weight of the work, are derived respectively from a pre-fetched command and parameters regarding the machine operation and stored in the parameter storage 11, and calculate a motor output based on the derived values by using the conversion data table created in Step 1.

Step 4: On the basis of the motor output calculated in Step 3, a current value of the amplifier is calculated out from the conversion formula formed in Step 2.

Step 5: Based on the current value thus obtained in Step 4, a heat value to be generated is calculated predictively. Manufacturers of amplifiers disclose heat values possibly generated in specifications of amplifiers or the like. For example, Fanuc Corporation provides the following conversion formulas for heat values generated with respect to current values of Fanuc's amplifiers: Formula 2 for obtaining a heat value of a common power supply aiPS, Formula 3 for obtaining a heat value of a servo amplifier aiSV and Formula 4 for obtaining a heat value of a spindle amplifier aiSP.

$$\text{Total heat value} = a + Ka \times b \quad \text{(Formula 2)}$$

where
a: heat value (W) depending on model of aiPS;
Ka: coefficient (W/Arms) depending on aiPS; and
b: continuous, rated output capacity (kW).

$$\text{Total heat value} = a + Ka1 \times b1 + Ka2 \times b2 + Ka3 \times b3 \quad \text{(Formula 3)}$$

where
a: heat value (W) depending on model of aiSV;
Ka1, Ka2, Ka3: coefficient of respective axes (W/Arms) depending on aiPS; and
b1, b2, b3: current (Arms) flowing through servomotors of respective axes.

$$\text{Total heat value} = a + Ka \times b \quad \text{(Formula 4)}$$

where
a: heat value (W) depending on model of aiSP;
Ka: coefficient (W/Arms) depending on aiSP; and
b: current (kW) flowing through spindle motor.

The cooling controller 15 determines the necessity of cooling on the basis of a heat value predicted by the heat value predictor 14 to control the cooler 16, such as wind-cooling unit, e.g. a fan, or water-cooling unit, so as to enable it, or continue to enable or disable it when already in operation. The cooling controller 15 may be adapted to bring, if a heat value predicted by the heat value predictor 14 exceeds a predetermined threshold, the cooler 16 into operation in response to the machine controller 10 starting the control causing the heat corresponding to the predicted heat value to generate, and disable the cooler 16 in response to the controller 10 stopping the aforementioned control. The cooling controller 15 may also be adapted to bring, if the heat value predicted by the heat value predictor 14 exceeds the predetermined threshold, the cooler 16 into operation a predetermined time before the machine controller 10 starts the control causing the heat corresponding to the predicted heat value to generate, and to disable the cooler 16 when a predetermined time lapses after the termination of that control. In this way, the cooling controller 15 may control the operation of the cooler 16 in timed with the control carried out by the machine controller 10. Moreover, if the cooler 16 is adapted to regulate a degree of cooling, the schedule of the above-mentioned threshold for heat value may be divided into several levels so as to select the degree of cooling carried out by the cooler 16 depending on the relationship of a heat value predicted by the heat value predictor 14 against the several thresholds.

Figure 2:
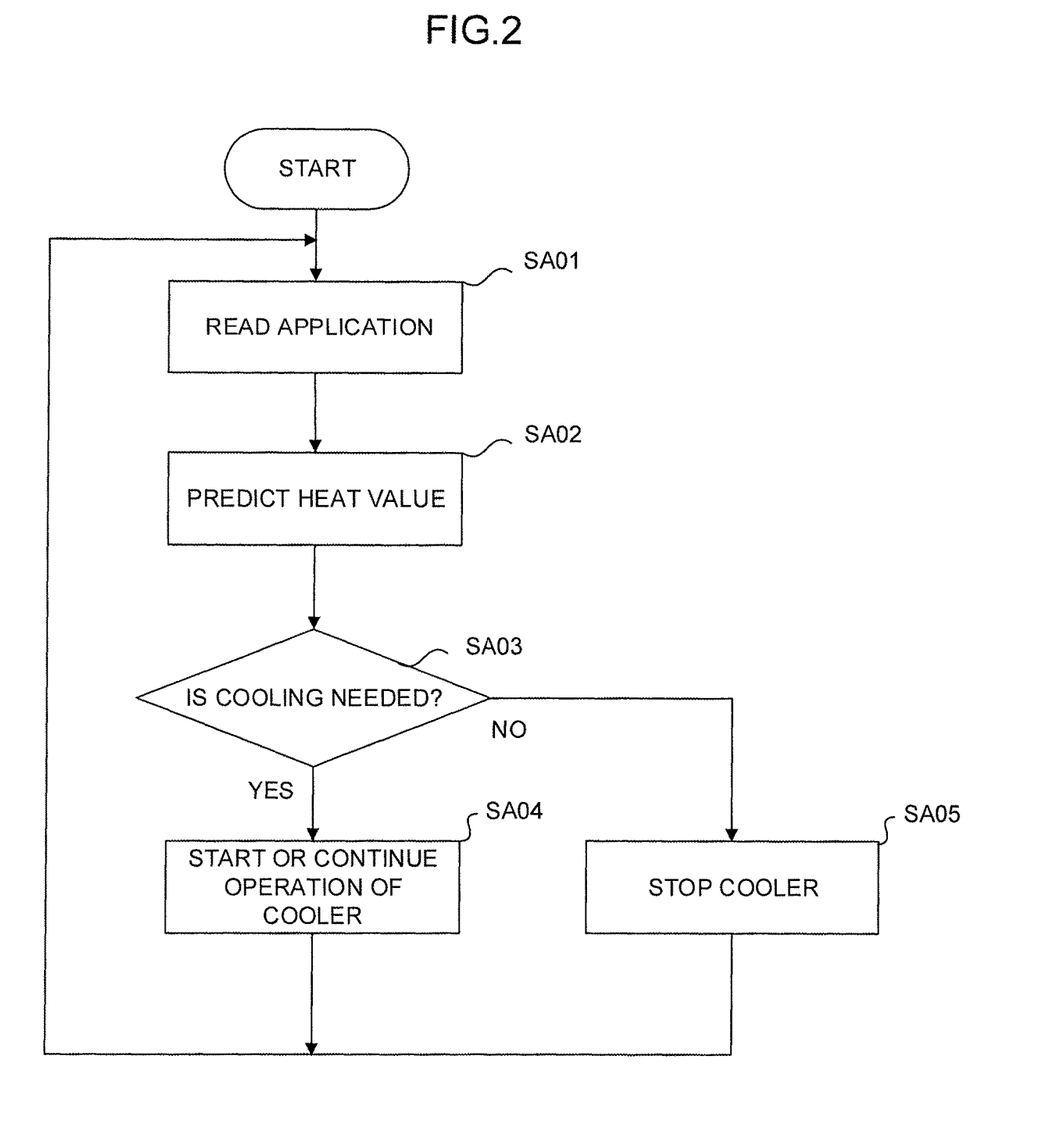
FIG. 2 is a flowchart showing an illustrative flow of an operation of the machine cooling mechanism 12 of FIG. 1.

FIG. 2 is a flowchart showing an illustrative flow of an operation of the machine cooling mechanism 12 of FIG. 1.

Step SA01: The pre-fetcher 13 pre-fetches a command from the applications 20 and outputs the pre-fetched command to the heat value predictor 14.

Step SA02: The heat value predictor 14 uses the pre-fetched command received from the pre-fetcher 13 as well as the parameters regarding the operation of the machine 1 stored in the parameter storage 11 to predict a value of heat that would otherwise be generated inside the control board of the machine 1, and then outputs the predicted heat value to the cooling controller 15.

Step SA03: The cooling controller 15 determines whether or not the cooling is necessary, based on the heat value received from the heat value predictor 14. Consequently, the operation processing proceeds to Step SA04 when the cooling is necessary, or to Step SA05 when the cooling is not necessary.

Step SA04: Upon commencement of the controlled operation of the machine 1 based on the command pre-fetched in Step SA01, the cooling controller 15 starts enabling the cooler 16 in synchronous manner, or continue to enable it when already in operation, then the processing goes back to Step SA01.

Step SA05: Upon termination of the controlled operation of the machine 1 based on the command pre-fetched in Step SA01, the cooling controller 15 stops the operation of the cooler 16 in synchronous manner, and the processing goes back to Step SA01.

Second Embodiment

Figure 3:
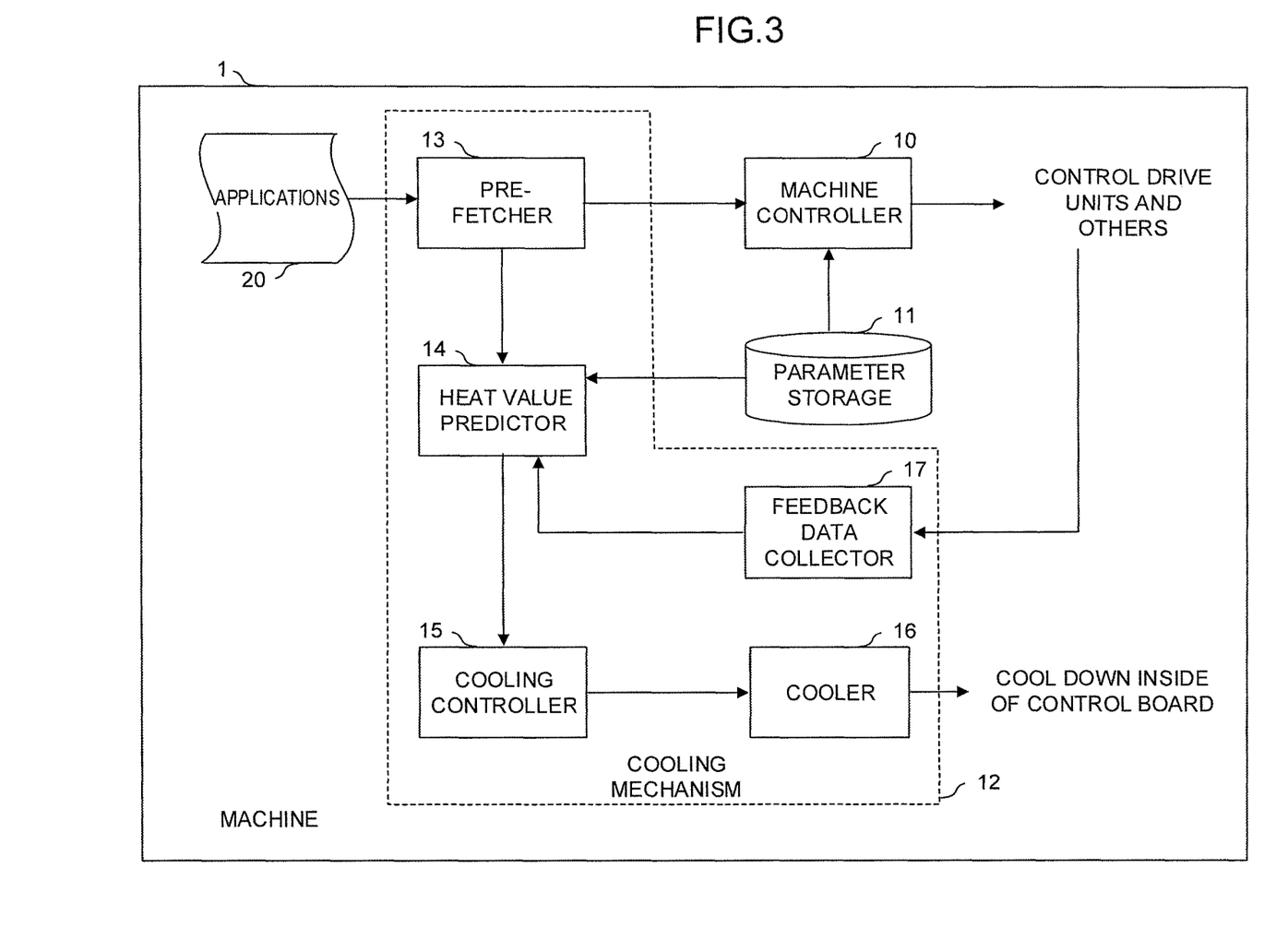
FIG. 3 is a schematic block diagram showing a cooling mechanism 12 for a machine according to a second embodiment of the present invention.

FIG. 3 is a schematic block diagram showing a cooling mechanism for a machine according to a second embodiment of the present invention. The cooling mechanism for a machine in the illustrative embodiment may be the same as that of the first embodiment except that a heat value predicted by the heat value predictor 14 is compensated for on the basis of feedback acquired from each part included in the machine 1. The cooling mechanism 12 for the machine in this embodiment includes a feedback data collector 17 in addition to the components included in the machine cooling mechanism 12 according to the first embodiment.

The feedback data collector 17 acquires feedback data presenting an operative state of each part of the machine 1, and outputs the acquired feedback data to the heat value predictor 14. The feedback data collector 17 may acquire as feedback data a load exerted on the motors, by way of example. Moreover, the feedback data collector 17 may acquire as feedback data current values measured on the amplifiers, the weight of an actual work and the like.

The heat value predictor 14 of the illustrative embodiment utilizes for heat value prediction the feedback data acquired from the feedback data collector 17 when making prediction on a heat value. For example, if the feedback data include a load value of a motor, that load value may be utilized instead of a motor output calculated in the above-described Process 3. If the feedback data is a current value of an amplifier, that current value can be utilized instead of a current value of the amplifier calculated in the above-described Process 4. Furthermore, if the feedback data include the weight of an actual work, that weight of the work can be utilized for calculating a motor output in the above-mentioned Process 3.

The heat value predictor 14 may also be used for predicting the heat value upon acquirement of the feedback data. It is also possible to map the acquired feedback data with commands in the applications 20 to be stored so as to reuse the mapped and stored feedback data in a subsequent operation conducted by the applications 20.

Figure 4:
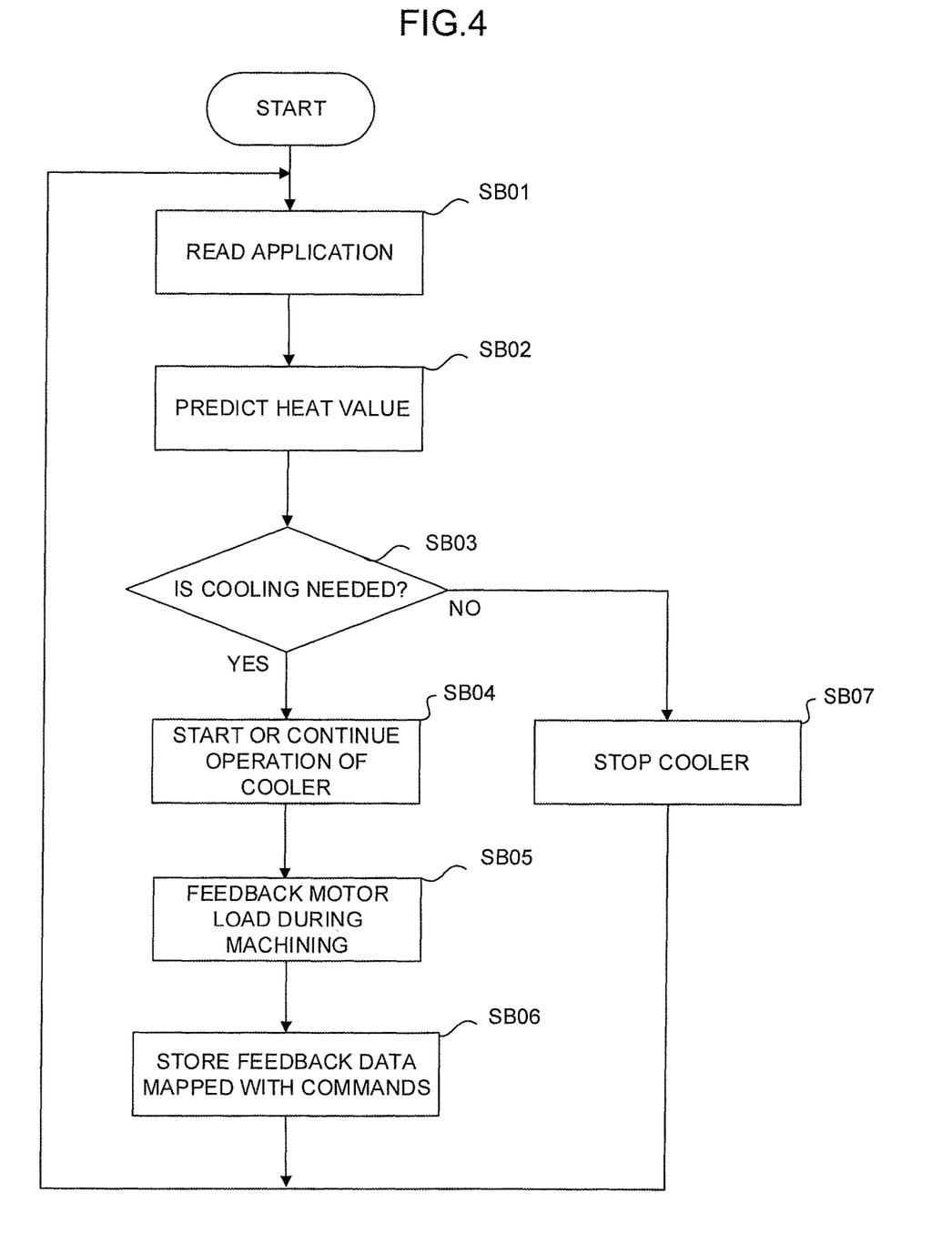
FIG. 4 is a flowchart showing an illustrative flow of an operation of the machine cooling mechanism 12 of FIG. 3.

FIG. 4 is a flowchart showing an illustrative flow of an operation of the machine cooling mechanism 12 of FIG. 3.

Step SB01: The pre-fetcher 13 pre-fetches a command from the applications 20 and outputs the pre-fetched command to the heat value predictor 14.

Step SB02: The heat value predictor 14 uses the pre-fetched command from the pre-fetcher 13 and the parameters stored in the parameter storage 11 concerning the operation of the machine 1 to predict a value of heat that would otherwise be generated inside the control board of the machine 1, and then outputs the predicted heat value to the cooling controller 15. If there are feedback data received from the feedback data collector 17 or there are stored feedback data mapped with that pre-fetched command, the feedback data are used for heat value prediction.

Step SB03: The cooling controller 15 determines whether or not the cooling is necessary, based on the heat value obtained from the heat value predictor 14. When the cooling is needed, the processing proceeds to Step SB04, whereas the processing proceeds to Step SB07 when the cooling is not needed.

Step SB04: Upon commencement of the controlled operation of the machine 1 performed based on the command pre-fetched in Step SB01, the cooling controller 15 the cooling controller 15 initiates enabling the cooler 16 in synchronous manner, or continue the operation when the cooler is already in operation.

Step SB05: The feedback data collector 17 acquires a load value of the motor, while machining, as feedback data.

Step SB06: The feedback data acquired in Step SB05 are mapped with the command pre-fetched in Step SB01, and stored.

Step SB07: Upon termination of the controlled operation of the machine 1 based on the command pre-fetched in Step SB01, the cooling controller 15 stops the operation of the cooler 16 in synchronous manner, and the processing goes back to Step SB01.

Third Embodiment

Figure 5:
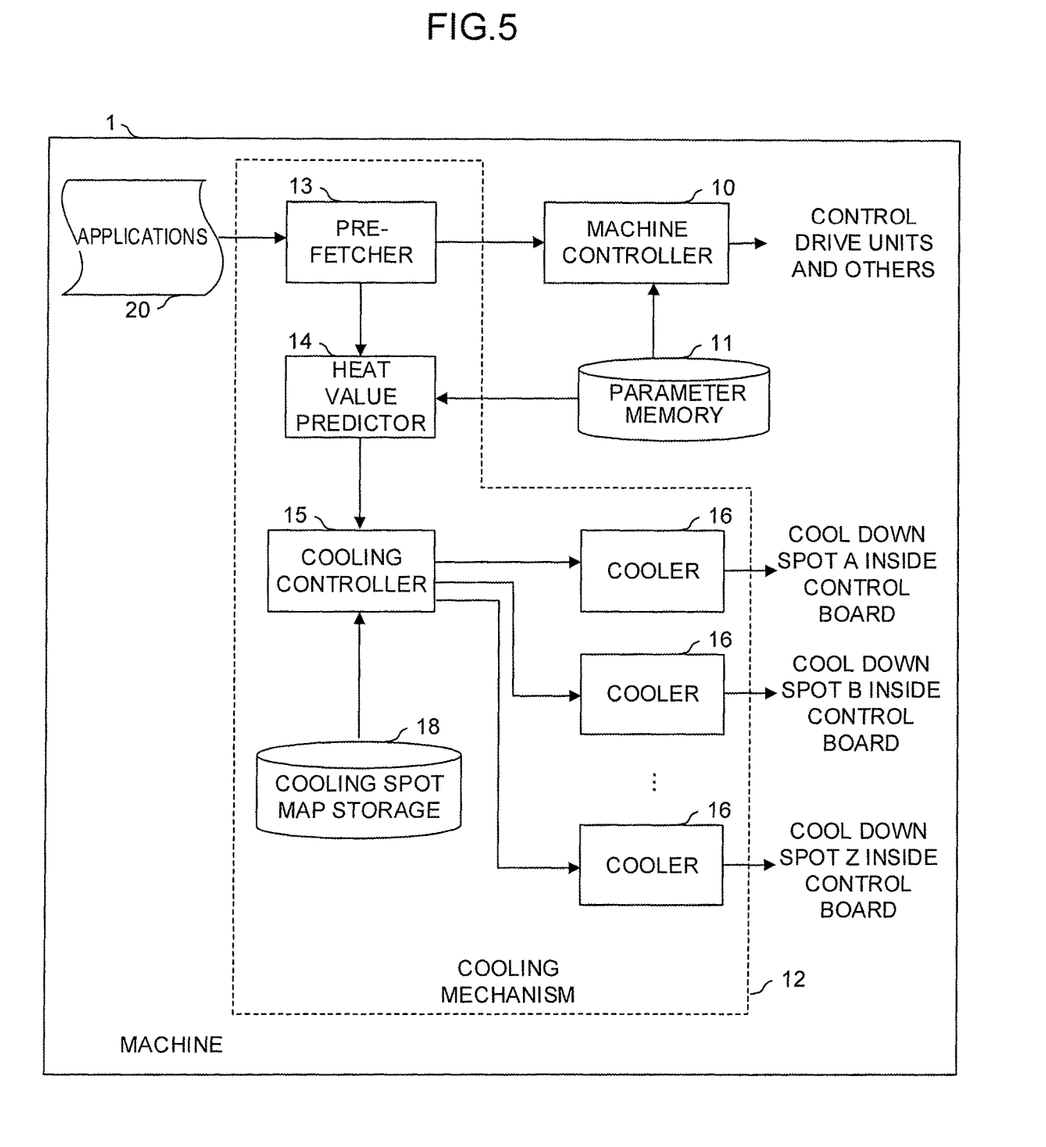
FIG. 5 is a schematic block diagram showing a cooling mechanism 12 for a machine according to a third embodiment of the present invention.

FIG. 5 is a schematic block diagram showing a cooling mechanism for a machine according to a third embodiment of the present invention. The cooling mechanism of the illustrative embodiment may be the same as the first embodiment except that the cooling mechanism 12 is provided with a plurality of coolers 16 for cooling correspondingly different portions or spots in the control board. The cooling mechanism 12 of the machine 1 of the illustrative embodiment includes the plurality of coolers 16 and a cooling spot map storage 18 in addition to the components of the machine cooling mechanism 12 of the first embodiment.

The cooling spot map storage 18 stores a cooling spot management table, in which data are recorded which map heat sources or spots, such as amplifiers, arranged in the control board with the corresponding coolers 16, arranged to cool down areas therearound. In the cooling spot management table, the heat sources can be recorded such that a heat source is associated with several of the several coolers 16. The heat sources arranged in the control board and the plurality of coolers 16 are managed with respective own identifications allotted thereto.

The heat value predictor 14 of this embodiment makes a prediction on either amplifiers or heat sources on the control board will be dealt with as a heat generator based on a pre-fetched command received from the pre-fetcher 13, prior to the heat value prediction. For example, when a pre-fetched command is that commanding shaft movement of the table, it can be predicted that an amplifier of a motor that drives a shaft to be used for the shaft movement will generate heat. When a pre-fetched command is that commanding a rotational movement of a spindle shaft or cutting operation of the spindle shaft, it can be predicted that another amplifier of the motor that drives the spindle shaft will generate heat. Thus, the heat value predictor 14 predicts a heat value from the heat source in the manner same as that of the first embodiment, and outputs the predicted heat value and information on the predicted heat source to the cooling controller 15. It is to be noted that in the case where heat generation in several heat sources can be predicted from a pre-fetched command, the heat value predictor 14 outputs information on plural combinations of predicted heat values with the predicted heat sources to the cooling controller 15.

The cooling controller 15 of the illustrative embodiment addresses the cooling spot management table stored in the cooling spot map storage 18, based on the information on the predicted heat source received from the heat value predictor 14, and determines one or more coolers 16 that can cool down the vicinity of the heat source in question. The cooling controller 15 then controls the determined cooler 16 on the basis of the heat value predicted by the heat value predictor 14. In the case where plural coolers 16 are defined as associated with heat sources in the cooling spot management table, the cooling controller 15 may selectively control one of those coolers, or may control the plural coolers 16 simultaneously, depending on a predicted heat value. A method for controlling the on/off operation of the cooler 16 performed by the cooling controller 15 may be the same as that in the first embodiment.

Figure 6:
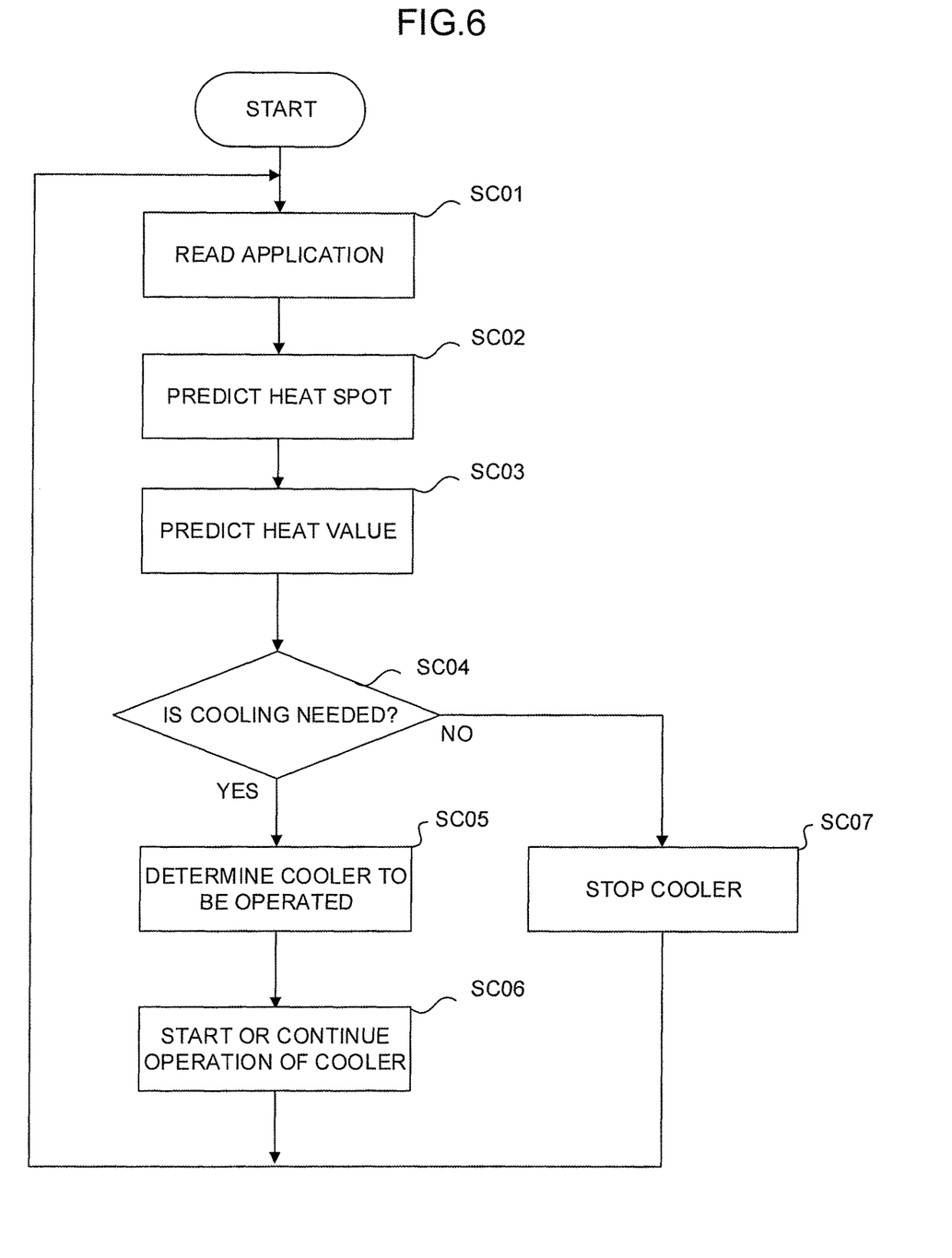
FIG. 6 is a flowchart showing an illustrative flow of an operation of the machine cooling mechanism 12 of FIG. 5.

FIG. 6 is a flowchart showing an illustrative flow of an example of an operation of the machine cooling mechanism 12 of FIG. 5

Step SC01: The pre-fetcher 13 pre-fetches a command from the applications 20, and outputs the pre-fetched command to the heat value predictor 14.

Step SC02: The heat value predictor 14 predict a heat source or heat spot anticipated to generate heat inside the control board of the machine 1 on the basis of the pre-fetched command received from the pre-fetcher 13 and the parameters concerning the operation of the machine 1 stored in the parameter storage 11.

Step SC03: The heat value predictor 14 predict a value of heat anticipated to be generated in the heat source predicted in Step SC02 on the basis of the pre-fetched command obtained from the pre-fetcher 13 as well as the parameters concerning the operation of the machine 1 stored in the parameter storage 11, and outputs information about the predicted heat value and the predicted heat source to the cooling controller 15.

Step SC04: The cooling controller 15 determines whether or not the cooling is needed, on the basis of the predicted heat value received from the heat value predictor 14. When the cooling is necessary, then the processing proceeds to Step SC05 whereas the processing proceeds to Step SCOT if no cooling is necessary.

Step SC05: The cooling controller 15 refers to the cooling spot management table stored in the cooling spot map storage 18 to specify a cooler 16 to be used to cool the heat source predicted by the heat value predictor 14.

Step SC06: Upon commencement of the controlled operation of the machine 1 based on the command pre-fetched in Step SB01, the cooling controller 15 initiates enabling the cooler 16 in synchronous manner specified in Step SC05, or continues the operation when the cooler is already in operation, and then the processing goes back to Step SC01.

Step SC07: Upon termination of the controlled operation of the machine 1 performed based on the command pre-fetched in Step SC01, the cooling controller 15 stops the operation of the cooler 16 in synchronous manner, and the processing goes back to Step SC01.

While the present invention has been described with reference to the particular illustrative embodiments, it is not to be restricted by those embodiments. It is to be appreciated that the embodiments can be implemented in various aspect by modifying them appropriately.

For example, the heat value predictor 14 and the cooling controller 15 are disposed inside the machine 1 in the above-described embodiments, but can be arranged in the cooler 16 or an external information processor. Correspondingly, the cooler 16 is disposed inside the machine 1 in the above-described embodiments, but can be arranged outside the machine 1.

Furthermore, the configurations described with reference to in the above illustrative embodiments may be appropriately combined with one another.

What is claimed is:

1. A cooling mechanism including at least one cooler cooling inside of a control board of a machine that comprises a machine controller controlling a drive unit based on a command contained in an application, said mechanism comprising:
a pre-fetcher pre-fetching the command contained in the application, the command indicating a movement operation of a motor axis of the machine;
a heat value predictor predicting a heat value to be generated inside the control board, by prior to executing the movement operation of the motor axis of the machine based on the command pre-fetched by the pre-fetcher;

1) calculating a motor output required to perform the movement operation of the motor axis of the machine,
2) calculating an electrical current to be consumed by the control board to achieve the motor output, and
3) predicting the heat value to be generated by the control board based on the electrical current to be consumed by the control board; and a cooling controller controlling an operation of the at least one cooler based on the heat value inside the control board predicted by the heat value predictor.

2. The cooling mechanism in accordance with claim 1, wherein the cooling controller controls the operation of the cooler in synchronous manner a controlled operation performed by the machine controller based on the command.

3. The cooling mechanism in accordance with claim 1, further comprises a feedback data collector for acquiring feedback data indicative of an actual operational state of the machine, wherein the heat value predictor uses the command pre-fetched by the pre-fetcher as well the feedback data acquired by the feedback data collector to predict a heat value to be generated inside the control board.

4. The cooling mechanism in accordance r ti claim 1, wherein the cooler is provided in plural, said mechanism further comprising a cooling spot map storage storing data mapping a plurality of heat sources in the control board with the coolers, wherein the heat value predictor predicts a heat source which would generate heat inside the control board, based on the command pre-fetched by the pre-fetcher, and predicts a value of heat which would be generated by the heat source, and the cooling controller refers to the cooling spot map storage based on the heat source predicted by the heat value predictor to determine the coolers to be operated, and then controls the operation of the determined cooler based on the heat value to be generated inside the control board predicted by the heat value predictor.

* * * * *